J. WATTERS,

Assignor to C. SCHUSSLER.

Mode of Securing Button-Holes.

No. 8,902. Reissued Sept. 16, 1879.

Witnesses:
Wm. H. C. Smith
John C. Hunbridge

Inventor:
John Watters
by his attorney
Aug Bieser

THE NORRIS PETERS CO., PHOTO-LITHO., WASHINGTON, D. C.

UNITED STATES PATENT OFFICE.

JOHN WATTERS, OF NEW YORK, N. Y., ASSIGNOR TO CHARLES SCHUSSLER, OF SAME PLACE.

IMPROVEMENT IN MODES OF SECURING BUTTON-HOLES.

Specification forming part of Letters Patent No. 133,554, dated December 3, 1872; Reissue No. 8,902, dated September 16, 1879; application filed August 9, 1879.

*To all whom it may concern:*

Be it known that I, JOHN WATTERS, of the city, county, and State of New York, have invented certain Improvements in Encircling Button-Holes with Metallic Rings, of which the following is a specification.

The object of my invention is to prevent the tearing of the fabrics into which button-holes are made, in a simpler, cheaper, and neater manner than could heretofore be done.

In order to describe my invention more fully, I will refer to the accompanying drawings forming part of this specification.

Figure 1:
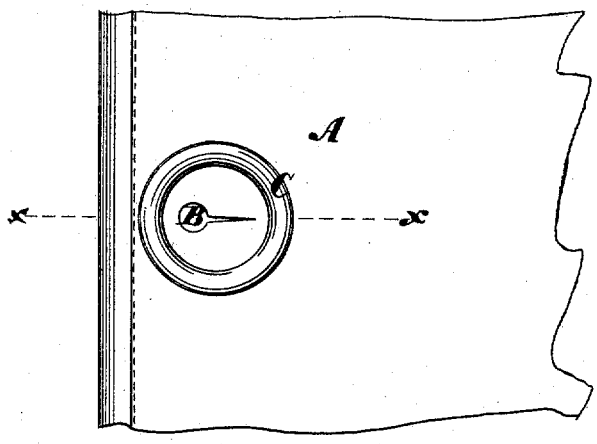
Figure 2:
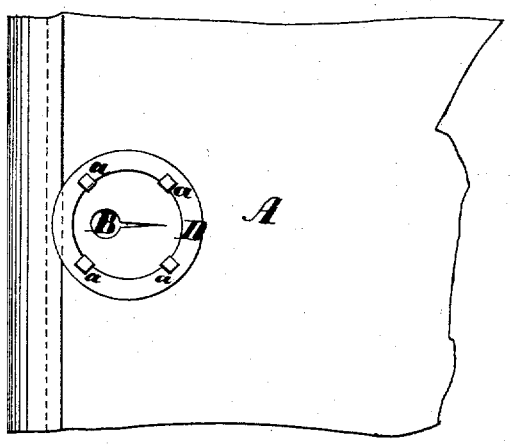
Figure 3:
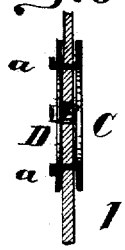
Figure 4:
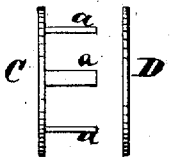

Figure 1 is a front view of a piece of carriage-cover embodying my invention. Fig. 2 is a back view of the same. Fig. 3 is a sectional view through line *x x*, Fig. 1. Fig. 4 is a detached side view of the rings.

Similar letters of reference indicate corresponding parts in all the figures.

A is the fabric, in which is cut the button-hole B. C is the front ring, which is stamped or pressed out of metal. *a a* are four (more or less) prongs or projections on the ring C, which are stamped or pressed out of the same metal as the ring C, and then bent at a right angle to the same. D is the back ring, also stamped or pressed out of metal, but without any projections. In order to apply the rings to the fabric, four (more or less) small holes are made in the latter, at a distance from and around the button-hole, as many as the ring C has prongs *a a*. These small holes are made to correspond with the prongs *a a*, that are inserted through them from the front of the fabric. The back ring D is then slipped over the prongs *a a*, that extend from the back of the fabric, and the prongs *a a* are bent over the ring D, thereby firmly holding the two rings C and D together, and compressing the fabric in such a manner that the tearing out of the fabric around the button-hole will be prevented.

I have found by experiment that the best metal for this purpose is Norwegian iron; but do not confine myself to this or any other metal, nor to the circular form of the rings. Oval or other forms of rings may be used to the same advantage.

I claim—

1. The carriage curtain or other analogous article made with a button-hole, B, and with a series of holes around the same, in combination with the ring C having prongs *a*, and with the ring D, substantially as herein shown and described.

2. The combination of two rings, C and D, and prongs *a*, with a carriage-curtain or other analogous article, having a button-hole within said rings, the fabric of said curtain having the button-hole being of one piece with that which surrounds and carries the said rings, substantially as herein shown and described.

JOHN WATTERS.
C. SCHUESSLER.

Witnesses:
T. B. MOSHER,
J. TURK.